United States Patent
Froehlich et al.

(10) Patent No.: US 7,240,566 B2
(45) Date of Patent: Jul. 10, 2007

(54) DEVICE FOR POSITIONING A CLAMP-ON FLOWMETER ON A CONTAINER

(75) Inventors: Thomas Froehlich, Münchenstein (CH); Achim Wiest, Weil am Rhein (DE); Andreas Berger, Therwil (CH); Harald Stocker, Schopfheim (DE); Torsten Strunz, Basel (CH); Auréle Fleury, Aesch (CH); Klaus Bussinger, Münchenstein (CH); Oliver Brumberg, Rheinfelden (DE)

(73) Assignee: Endress + Hauser Flowtec AG, Reinach (CH)

( * ) Notice: Subject to any disclaimer, the term of this patent is extended or adjusted under 35 U.S.C. 154(b) by 0 days.

(21) Appl. No.: 10/537,353

(22) PCT Filed: Dec. 6, 2003

(86) PCT No.: PCT/EP03/13838

§ 371 (c)(1),
(2), (4) Date: Dec. 19, 2005

(87) PCT Pub. No.: WO2004/055484

PCT Pub. Date: Jul. 1, 2004

(65) Prior Publication Data

US 2006/0123922 A1   Jun. 15, 2006

(30) Foreign Application Priority Data

Dec. 16, 2002   (DE) ................................ 102 58 997

(51) Int. Cl.
*G01F 1/66* (2006.01)
(52) U.S. Cl. .................................................. 73/861.29
(58) Field of Classification Search ..................... None
See application file for complete search history.

(56) References Cited

U.S. PATENT DOCUMENTS

| 3,987,674 | A |   | 10/1976 | Baumoel |
| 4,286,470 | A |   | 9/1981  | Lynnworth |
| 4,373,401 | A |   | 2/1983  | Baumoel |
| 4,425,803 | A |   | 1/1984  | Baumoel |
| 4,991,441 | A | * | 2/1991  | Nottingham et al. ......... 73/633 |
| 5,131,278 | A |   | 7/1992  | Baumoel |
| 5,856,622 | A |   | 1/1999  | Yamamoto et al. |
| 2004/0083815 | A1 | * | 5/2004 | Lam et al. .................... 73/618 |
| 2004/0127793 | A1 | * | 7/2004 | Mendlein et al. ........... 600/442 |

FOREIGN PATENT DOCUMENTS

| DE | 101 47 175 A1 | 4/2003 |
| EP | 0 733 885 A1  | 9/1996 |
| EP | 1 235 056 A2  | 8/2002 |
| EP | 1 248 081 A2  | 10/2002 |
| EP | 1 291 620 A2  | 3/2003 |

* cited by examiner

*Primary Examiner*—Harshad Patel
(74) *Attorney, Agent, or Firm*—Bacon & Thomas, PLLC

(57) ABSTRACT

An apparatus for the positioning of a clamp-on flow measuring device on a containment, which has a medium flowing through it. The apparatus includes at least two ultrasonic transducers, which emit measuring signals into the containment and/or receive measuring signals from the containment, a positioning unit for the variable positioning of the ultrasonic transducers on the containment, a control/evaluation unit, which calculates from predetermined process and/or system variables a characteristic, desired variable of the measuring signals and which determines on the basis of a comparison of the calculated, desired variable with the corresponding, measured, actual variable, whether the ultrasonic transducers are optimally positioned or whether the position of the ultrasonic transducers need to be changed, and an indicating unit, which indicates to operating personnel a required change of position and/or the direction in which a change of position needs to be made.

10 Claims, 2 Drawing Sheets

DEVICE FOR POSITIONING A CLAMP-ON FLOWMETER ON A CONTAINER

FIELD OF THE INVENTION

The invention relates to an apparatus for positioning a clamp-on flow measuring device on a containment, which has a medium flowing through it.

BACKGROUND OF THE INVENTION

Clamp-on, ultrasonic, flow measuring devices are used often in process and automation technology. They permit contactless determination of volume flow rate and/or mass flow rate of a medium in a containment, especially in a pipeline. Additionally, they have the advantage that they can be placed externally on the pipeline. Clamp-on, ultrasonic, flow measuring devices are described, for example, in EP 0 686 255 B1, U.S. Pat. No. 4,484,478 or U.S. Pat. No. 4,598,593.

The known ultrasonic measuring devices work either by the Doppler principle or the travel-time-difference principle. In the case of the travel-time-difference principle, the different travel times of the ultrasonic measuring signals in the direction of flow, and counter to the direction of flow, of the medium are exploited. To this end, the ultrasonic measuring signals are alternatingly emitted, respectively received, in the direction of flow, and counter to the direction of flow, of the medium. On the basis of the travel-time-difference of the ultrasonic measuring signals, the flow velocity can be determined, and, with that and known diameter of the pipe, the volume flow rate of the medium, or, with known density, the mass flow rate of the medium.

In the case of the Doppler principle, ultrasonic measuring signals of predetermined frequency are coupled into the flowing medium. The ultrasonic measuring signals reflected in the medium are evaluated. On the basis of a frequency shift occurring between the ultrasonic measuring signal which was coupled into the medium and the reflected ultrasonic measuring signal, likewise the flow velocity of the medium, or the volume and/or mass flow rate, can be determined. The use of flow measuring devices working according to the Doppler principle is only possible, when, present in the medium, are air bubbles or contaminants, on which the ultrasonic measuring signals are reflected. Thus, the use of ultrasonic flow measuring devices using the Doppler principle are rather limited, compared to ultrasonic flow measuring devices using the travel-time-difference principle.

In the case of clamp-on, ultrasonic, flow measuring devices working according to the travel-time-difference principle, the ultrasonic measuring signals are radiated at a predetermined angle into the containment in which the medium is located. In order that as large a part as possible of the energy radiated from an ultrasonic transducer into the containment be received in the other ultrasonic transducer, the two ultrasonic transducers must have a defined separation from one another. The particular positions of the ultrasonic transducers on the containment depends on the inner diameter of the pipeline and on the velocity of sound in the medium. As further application parameters, with which relatively large errors can be associated, the wall thickness of the pipeline and the velocity of sound in the material of the pipeline can be named.

Depending on application, still another source of error can arise in the case of clamp-on flow measuring devices, such error coming from temperature changes of the medium or the environment. An ultrasonic transducer usable for a clamp-on flow measuring device contains at least one piezoelectric element (producing the ultrasonic measuring signals) and a coupling wedge. The coupling wedge is usually made of plastic and serves, on the one hand, to radiate the ultrasonic measuring signals at a defined angle into the pipe and, on the other hand, for impedance matching. The ultrasonic measuring signals produced in a piezoelectric element are conducted via the coupling wedge, or lead-in member, and the pipe wall, into the liquid medium. Since the velocities of sound in a liquid and in plastic differ from one another, the ultrasonic waves are refracted in passing from one medium into the other. The angle of refraction is determined by Snell's Law, i.e. the angle of refraction depends on the ratio of the propagation velocities of the two media. In general, with wedges, or lead-in members, of plastic, a good impedance matching can be achieved; however, the velocity of sound in plastic shows a relatively strong temperature dependance. Typically, the velocity of sound in plastic changes from about 2500 m/s at 25□C to about 2200 m/s at 130□C. In addition to the change of the travel time of the ultrasonic measuring signals caused by the temperature in the plastic of the coupling wedge, the direction of propagation of the ultrasonic measuring signals also changes in the flowing medium. Both changes thus affect measurement accuracy unfavorably in an ultrasonic flow measuring device working according to the travel-time-difference method. In order to keep measurement accuracy at a constant, high level, corrections of the positions of the ultrasonic transducers are, therefore, required. The angular positioning of the ultrasonic transducers is fixedly predetermined in the case of the known flow measuring devices. For the purpose of initial mounting or in the case of later application changes, it is necessary, due to the above considerations, to be able to adjust the separation of the two ultrasonic transducers with respect to one another in a defined manner. For this purpose, usually one of the two ultrasonic transducers is shifted relative to the other, until that position is found, in which the intensity of the measuring signals received from the ultrasonic transducers is maximum. Once the optimum separation of the two ultrasonic transducers has been determined in this 'trial and error' technique, the two ultrasonic transducers are locked tight on the pipe wall in the determined positions. This method is, understandably, relatively time consuming. For simplifying the relative movement of the ultrasonic transducers, mechanical positioning aids are used, such as millimeter scales or perforated rail. A positioning aid working with a perforated rail is described, for example, in EP 0 974 815 A1.

Added to this is the fact that some of the application parameters, which, especially in the case of a clamp-on flow measuring device, are needed for exact determination of the volume flow rate, are only in the rarest cases known with sufficient accuracy—or, the determination of these parameters is rather complicated. While the determination of the outer diameter of the pipeline scarcely offers any problems, the exact determination of the wall thickness of the pipeline can be quite problematic. In many cases, moreover, neither the velocity of sound in the material of the pipeline, nor the velocity of sound in the medium, is exactly known.

SUMMARY OF THE INVENTION

An object of the invention is to provide an apparatus, with which the positioning of a clamp-on flow measuring device on a containment is simplified.

The object is achieved in the following manner. Two ultrasonic transducers are provided, which emit measuring signals into the containment and/or receive measuring signals from the containment. Additionally provided are a positioning unit for the variable positioning of the ultrasonic transducers on the containment and a control/evaluation unit, with the control/evaluation unit calculating from predetermined process and/or system variables a characteristic, desired variable of the measuring signals and, on the basis of a comparison of the calculated, desired value with the corresponding, measured, actual variable, determines whether the ultrasonic transducers are optimally positioned or whether the positions of the ultrasonic transducers should be changed. Beyond this, an indicating unit is used, which displays the required position change and/or the direction in which a position change must occur.

According to the invention, detection of an erroneous positioning of the ultrasonic transducers and a countermeasure for erasing this erroneous positioning result on the basis of the signals received, in each case, in a receiving, ultrasonic transducer. On the basis of the received measuring signals, at least one characteristic, actual variable of the measuring signal arising under the application conditions is determined.

The characteristic variable is preferably the intensity of the measuring signals and/or the travel time of the measuring signals. This measured value is compared with a corresponding, characteristic, desired variable. If the characteristic variable is the travel time, then the corresponding desired variable is calculated, with the refraction law of Snell being used in the calculation. Usually, not all the variables in the corresponding equations are exactly known. Thus, in many cases, the exact velocity of sound in the medium is not known. In such a case, e.g. the most probable value taken from a table is used for the velocity of sound in the medium. Alternatively, it is possible to determine the velocity of sound in the medium on the basis of a measurement, in which the travel time of ultrasonic waves perpendicular to the flow direction of the medium is measured. Such methods are already used in practice, so that an exact description is not needed here.

In a preferred embodiment of the apparatus of the invention, the indicating unit is embodied such that it signals the operating personnel the correct position optically or acoustically or such that the indicating unit gives the operating personnel, if necessary, successive indications in which direction at least one of the ultrasonic transducers is to be moved for the purpose of correct positioning. An advantageous embodiment of the apparatus of the invention provides that the indicating unit is an integral part of the clamp-on flow measuring device. Especially, it is provided that the indicating unit is a display.

The information to the user can be, for example, the displacement direction; and/or, the amount of displacement of the two ultrasonic transducers is provided on the indicating unit in the form of numeric or graphic symbols.

In principle, the indicating unit can be at least one optical and/or at least one acoustic, reporting element, with the element used in each case being operable in various modes.

Especially, the optical reporting element can be a light-emitting diode, with the modes, in this case, being e.g. a blinking mode, an on-mode and/or an off-mode.

Alternatively or supplementally, the optical reporting element is embodied such that different color characteristics and/or symbols are associated with the different modes.

If an acoustic reporting element is used, then it is preferably embodied such that the different modes are implemented by different pitches and/or by different repetition frequencies of at least one pitch.

BRIEF DESCRIPTION OF THE DRAWINGS

The invention will now be explained in greater detail on the basis of the drawings, the figures of which show as follows.

DESCRIPTION OF THE PREFERRED EMBODIMENTS

Figure 1:
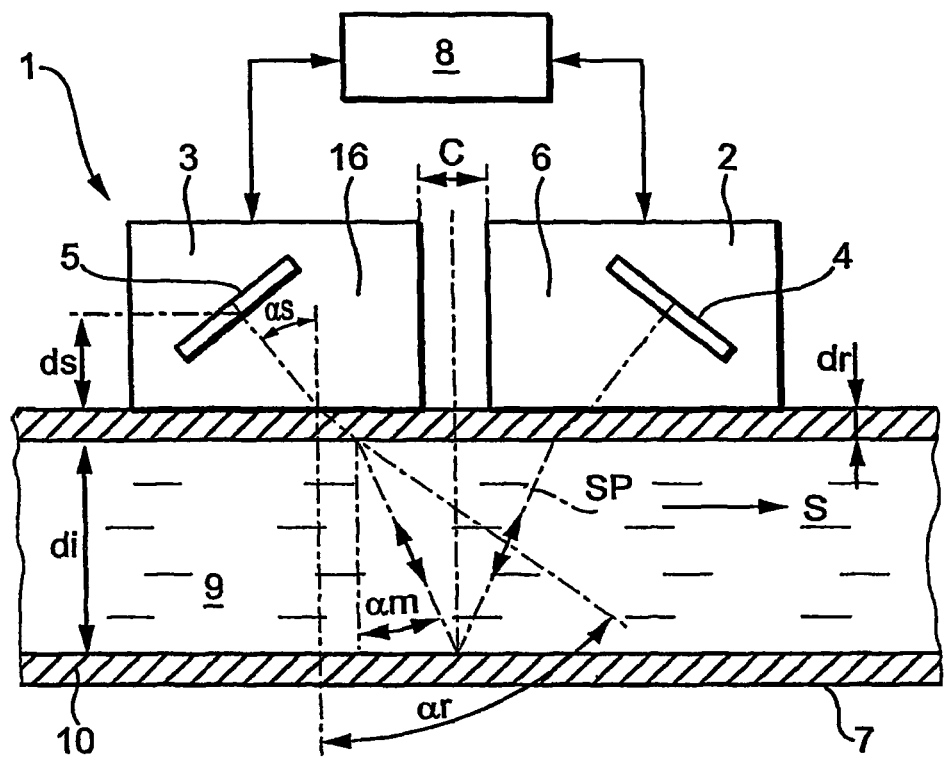
FIG. 1 a schematic illustration of the sound path of an ultrasonic measuring signal in a pipeline.

FIG. 1 shows a schematic illustration of the sound path SP of an ultrasonic measuring signal in a pipeline, e.g. in a pipe 7. The clamp-on flow measuring device 1 determines the volume, or mass, flow rate of the medium 9 in the pipe 7, using the known travel-time-difference method.

Essential components of the clamp-on ultrasonic flow measuring device 1 are the two ultrasonic transducers, which may be ultrasonic sensors, 2, 3 and the control/evaluation unit 8. The two ultrasonic transducers 2, 3 are attached to the pipe 7 by means of a securement apparatus not separately shown in FIG. 1. Appropriate securement apparatuses are sufficiently known from the state of the art and are also available from the assignee. The pipe 7 of inner diameter di has medium 9 flowing through it in the stream direction S.

An ultrasonic transducer 2; 3 has, as essential components, at least one piezoelectric element 4; 5, which produces and/or receives the ultrasonic measuring signals, and a coupling wedge 6; 16. The ultrasonic measuring signals are coupled via the coupling wedge 6; 16 and via the pipe wall 10 into, and out of, the pipe 7 containing the flowing medium 9. The two ultrasonic transducers 2, 3 are embodied such that they emit and receive ultrasonic measuring signals. The optimum separation c of the two ultrasonic transducers 2, 3 is—as already indicated above—dependent on various system and/or process variables. In order to assure that the maximum energy emitted from an ultrasonic transducer 2; 3 is received in the other ultrasonic transducer 3; 2, a positioning of the ultrasonic transducers 2, 3 matched to the particular instance of application is required. The referenced system and process variables include, for example, the inner diameter di of the pipe 7, the wall thickness dr of the pipe 7, the velocity of sound cr in the material that the pipe 7 is made of, or the velocity of sound cm in the medium 9. In principle, an adjustment of the ultrasonic transducers 2, 3 is required both in the case of the initial mounting of the transducers on the pipeline and, additionally, at any time when a significant change of at least one process and/or system variable occurs.

In the illustrated example of an embodiment, the separation c of the two ultrasonic transducers 2, 3 is sized such that the ultrasonic measuring signals, which, according to the travel-time-difference method, are emitted and received in alternation by the two ultrasonic transducers 2, 3, propagate via only one sound path SP in the containment 7 containing the flowing medium 9. The sound path SP has two traverses.

One traverse is that part of the sound path SP, in which an ultrasonic measuring signal crosses the containment 7 once. The crossing can be diametral or chordal.

If the following variables are known at least approximately, then the desired variable, which, according to the invention, is specified at the beginning to the position and status indicating unit, can be calculated. Such variables are, in particular, as follows:

the distance ds between an ultrasonic transducer 2; 3 and the pipe wall 10;
the thickness dr of the pipe wall 10;
the inner diameter di of the pipe 7;
the velocity of sound cs in the lead-in member 6; 7;
the velocity of sound cr in the pipe 7;
the velocity of sound cm in the medium 9;
the angle αs in the ultrasonic transducers 2; 3;
the angle αr in the pipe 7;
the angle αm in the medium; and
the number n of traverses. In the illustrated case, n=2.

The angle of incidence αr in the pipe 7 can be represented with the aid of Snell's law by the following formula:

$$\alpha r = a\sin\left(\frac{cr}{cs} \cdot \sin(\alpha s)\right)$$

The incoming angle αm into the medium 9 can be described by the following formula:

$$\alpha m = a\sin\left(\frac{cm}{cs} \cdot \sin(\alpha s)\right)$$

The travel time Tdesired of the ultrasonic measuring signals on the sound path SP can then be calculated on the basis of the following formula:

$$Tsoll = \frac{2 \cdot ds}{\cos(\alpha s) \cdot cs} + \frac{2 \cdot dr}{\cos(\alpha r) \cdot cr} + \frac{n \cdot di}{\cos(\alpha m) \cdot cm}$$

If all parameters are known, then the travel time Tdesired of the ultrasonic measuring signals is calculable using the above formula. In this, it was also assumed that the flow rate in the pipeline 7 is zero. Now, in a large number of cases of application, at least the velocity of sound cm in the medium 9 is not known. As a result, the measured travel time Tactual does not agree with the calculated travel time Tdesired, since, in many cases, for the purpose of simplification, an estimated value is used for the velocity of sound cm in the medium 9. A better result can be achieved, if the velocity of sound cm in the medium 9 is measured in a separate step of the method.

Then, the actual travel time Tactual of the ultrasonic measuring signal is measured and compared with the calculated travel time Tdesired. If, on the basis of the comparison, it turns out that the measured travel time Tactual is greater than the initially given travel time Tdesired, then the two ultrasonic transducers 2, 3 must be moved closer together; the separation c of the two ultrasonic transducers 2, 3 thus becomes less. If, in contrast, the measured travel time Tactual is smaller than the initially specified travel time Tdesired, then the two ultrasonic transducers 2, 3 must be separated more, i.e. the separation c is made larger. According to the invention, an indication is now made to the operating personnel, in which direction and, where appropriate, by what amount, the relative movement of the ultrasonic transducers 2, 3 must be made to happen.

Figure 2:
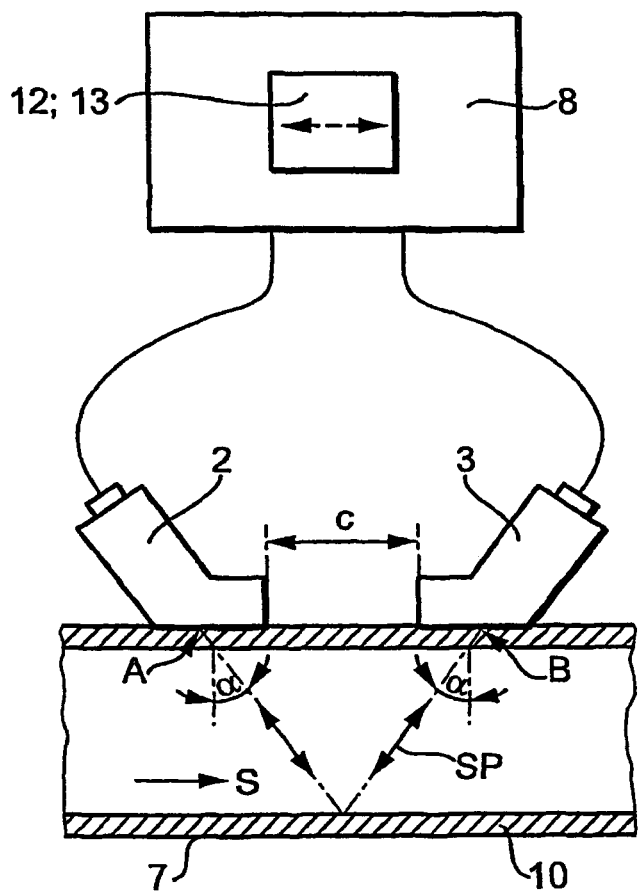
FIG. 2 a schematic illustration of a first embodiment of the apparatus of the invention.
Figure 3:
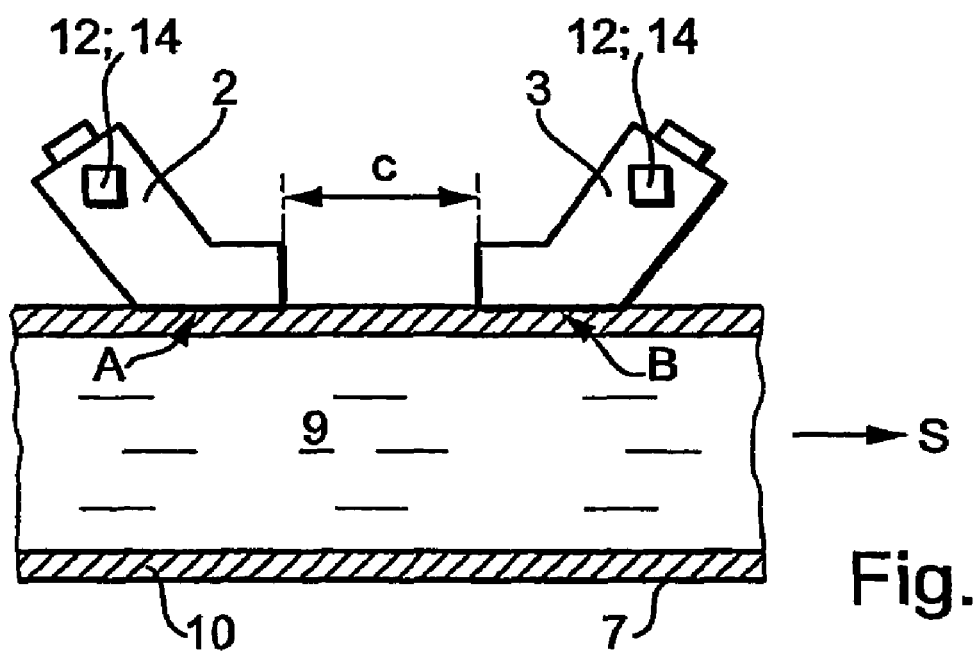
FIG. 3 a schematic illustration of a second embodiment of the apparatus of the invention.
Figure 4:
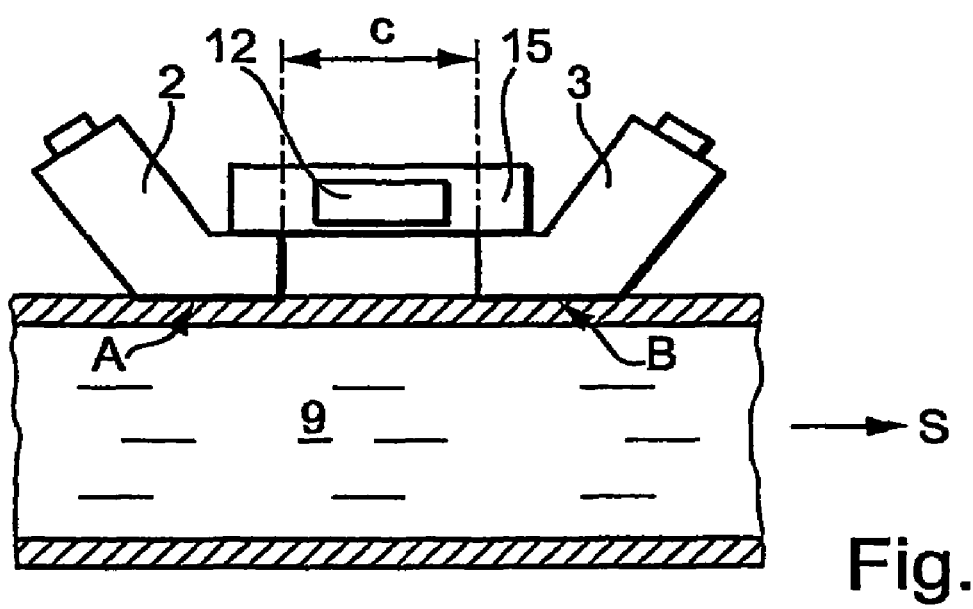
FIG. 4 a schematic illustration of a third embodiment of the apparatus of the invention.

FIGS. 2 to 4 are schematic illustrations of different embodiments of the apparatus of the invention. As already mentioned, the position and status indicating unit 12 reports to the operating personnel the information needed for the positioning of the ultrasonic transducers 2, 3. In the case illustrated in FIG. 2, the indication of status and position occurs via a display 13, which is integrated into the control/evaluation unit 8. The indication of direction of the displacement of the ultrasonic transducers 2, 3 is presented in the illustrated case via arrows; especially symbolized here is that the ultrasonic transducers 2, 3 must have a greater separation c from one another. The amount of the needed displacement can be indicated via the length of the arrows. A reaching of the prescribed separation c of the ultrasonic transducers 2, 3 can be symbolized, for example, by a disappearance of the arrows, or an appropriate text, e.g. 'sensor position reached', or a corresponding, generally understandable symbol.

FIG. 3 shows an alternative embodiment of the status and position indicating unit 12 of the invention in the case of a clamp-on ultrasonic flow measuring device 1. The indicating is done here via the two reporting elements 14, which are, in the simplest case, light-emitting diodes. For example, their color or blinking indicates in which direction the two ultrasonic transducers 2, 3 must be displaced or whether the correct position—represented by the ideal in-coupling points A, B—has already been reached.

In FIG. 4, the two ultrasonic transducers 2, 3 are connected with one another via a guide element, especially via a track 15. Track 15 can be embodied as a measuring system. Alternatively, it is provided that the measuring system is integrated into the track 15. This measuring system determines, also here, the distance c between the two ultrasonic transducers 2, 3 and shows a required displacement, should such be the case. The track 15 facilitates the axially parallel displacement of the two ultrasonic transducers 2, 3 relative to the pipe 7. As already mentioned, such positioning units are already present in the state of the art.

Indication of the displacement direction again is done on a display 13, e.g. by means of a linear potentiometer with digital readout. Of course, indication of the required displacement of the ultrasonic transducers 2, 3 can also be done using one or more light-emitting diodes mounted on the guide element 15. Beyond this, in all cases, alternatively or supplementally, an acoustic indication is possible, instead of the optical indication.

Additionally, a preferred embodiment of the apparatus of the invention provides that the ultrasonic transducers 2, 3 are automatically moved into the correct position, on the basis of the deviation of the current value of the characteristic variable from the corresponding, initially given variable. In this case, the indicating unit 12 can then be completely omitted. Only the positioning mechanism, as such, must be automated. Appropriate automatic positioning mechanisms are sufficiently known from many areas of application (e.g. the machining of materials).

The invention claimed is:

1. An apparatus for positioning a clamp-on flow measuring device on a containment, through which a medium is flowing, comprising:
   at least two ultrasonic transducers, which emit measuring signals into the containment and/or receive measuring signals from the containment;
   a positioning unit for the variable positioning of said ultrasonic transducers on the containment;

a control/evaluation unit, which calculates from predetermined process and/or system variables a characteristic, desired variable of the measuring signals and which, on the basis of a comparison of the calculated, desired variable with the corresponding, measured, actual variable, determines whether said ultrasonic transducers are optimally positioned or whether the positions of said ultrasonic transducers need to be changed; and an indicating unit, which indicates to operating personnel a required change in position and/or the direction in which a change in position needs to occur.

2. The apparatus as claimed in claim 1, wherein:

said indicating unit is embodied such that it signals to the operating personnel optically and/or acoustically the correct position of said ultrasonic transducers or such that said indicating unit gives to the operating personnel, if necessary, successive indications, in which direction said ultrasonic transducers need to be displaced for the purpose of correct positioning.

3. The apparatus as claimed in claim 1, wherein:

said indicating unit is an integral part of the clamp-on flow measuring device.

4. The apparatus as claimed in claim 1, wherein:

said indicating unit is a display.

5. The apparatus as claimed in claim 4, wherein:

the direction of displacement, and/or the amount of displacement, of said two ultrasonic transducers is placed on said indicating unit in the form of numerical and/or graphical symbols.

6. The apparatus as claimed in claim 1, wherein:

said indicating unit comprises at least one optical and/or at least one acoustical reporting element, said reporting element being operable in different modes.

7. The apparatus as claimed in claim 6, wherein:

said optical reporting element is a light-emitting diode, wherein the modes comprise a blinking mode, an on-mode and/or an off-mode.

8. The apparatus as claimed in claim 6, wherein:

said optical reporting element is embodied such that the different modes are associated with different color characteristics and/or symbols.

9. The apparatus as claimed in claim 6, wherein:

said acoustic reporting element is embodied such that the different modes are implemented by different pitches and/or different repetition frequencies of at least one pitch.

10. The apparatus as claimed in claim 1, wherein:

the characteristic variable is the intensity of the measuring signals and/or the travel time of the measuring signals.

* * * * *